United States Patent
Fisher et al.

(10) Patent No.: US 6,403,163 B1
(45) Date of Patent: Jun. 11, 2002

(54) METHOD OF TREATING SURFACES WITH ORGANOSILICON WATER REPELLENT COMPOSITIONS

(75) Inventors: Paul David Fisher; Feifei Lin; Lori Ann Stark-Kasley, all of Midland, MI (US)

(73) Assignee: ChemRex, Inc., Shakopee, MN (US)

( * ) Notice: Subject to any disclaimer, the term of this patent is extended or adjusted under 35 U.S.C. 154(b) by 0 days.

(21) Appl. No.: 09/604,447

(22) Filed: Jun. 27, 2000

(51) Int. Cl.⁷ .............................. B05D 3/02; C08G 77/04
(52) U.S. Cl. .......................... 427/387; 427/136; 106/2; 106/287.14; 106/287.16; 524/588; 524/837
(58) Field of Search ................................. 427/136, 387; 106/2, 287.14, 287.16; 524/588, 837

(56) References Cited

U.S. PATENT DOCUMENTS

| | | | |
|---|---|---|---|
| 2,438,478 A | 3/1948 | Hyde | 260/448.2 |
| 4,082,726 A * | 4/1978 | Mine et al. | |
| 4,342,796 A * | 8/1982 | Brown et al. | 427/136 |
| 4,554,331 A * | 11/1985 | Fey et al. | 525/478 |
| 4,559,227 A | 12/1985 | Chandra et al. | 424/70 |
| 4,648,904 A * | 3/1987 | DePasquale et al. | 106/2 |
| 4,701,380 A * | 10/1987 | Narula et al. | 428/447 |
| 5,074,912 A | 12/1991 | Liles et al. | 106/2 |
| 5,086,146 A * | 2/1992 | Liles et al. | 528/15 |
| 5,300,327 A | 4/1994 | Stark-Kasley et al. | 427/387 |
| 5,326,483 A | 7/1994 | Halloran et al. | 252/174.15 |
| 5,449,712 A | 9/1995 | Gierke et al. | 524/266 |
| 5,695,551 A | 12/1997 | Buchingham et al. | 106/2 |
| 5,919,296 A | 7/1999 | Be et al. | 106/287.14 |
| 6,030,444 A | 2/2000 | Couttenier | |
| 6,106,607 A * | 8/2000 | Be et al. | 106/781 |

* cited by examiner

*Primary Examiner*—Robert Dawson
*Assistant Examiner*—Jeffrey B. Robertson
(74) *Attorney, Agent, or Firm*—Renner, Kenner, Greive, Bobak, Taylor & Weber

(57) ABSTRACT

A composition for rendering surfaces water repellent is formed by combining water or a solvent; a methylhydrogensiloxane polymer or copolymer; an alkoxysilane having the formula $R_aSi(OR')_{4-a}$ in which R represents an alkyl group containing 1–10 carbon atoms, an alkenyl group containing 2–8 carbon atoms, an aryl group, or an haloalkyl group, a has a value of 1 or 2, and R' represents an alkyl group containing 1–6 carbon atoms; and a silicone resin. The composition can also contain other components such as a volatile methyl siloxane, a cationic oil-in-water emulsion of an aminofunctional polydimethylsiloxane, a surfactant, a catalyst, a beading agent, an organic wax, a preservative, an antifoam, a mildewcide, an UV absorber/UV light stabilizer, or a freeze-thaw additive.

7 Claims, No Drawings

METHOD OF TREATING SURFACES WITH ORGANOSILICON WATER REPELLENT COMPOSITIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to organosilicon compositions which are useful as water repellents for application to the surface of mineral substrates used in the construction industry. Representative mineral substrates are building materials such as brick, cured concrete, sewer pipe, hollow block, cured mortar, stucco, decorative stone, roofing tile, and structures which incorporate such building materials, i.e., highway surfaces, bridges, concrete, stone or brick building exteriors, footings, and retaining walls.

The organosilicon compositions can also be used in the preparation of castable or trowelable mineral compositions such as uncured cement; as compositions for use on wood substrates, particularly compositions for exterior residential wood decks; in the manufacture of gypsum wall board whether incorporated into uncured formulations or applied to the surface of gypsum wall boards; and in the manufacture of inorganic granules for roofing shingles.

BACKGROUND OF THE INVENTION

While U.S. Pat. No. 5,074,912 (Dec. 24, 1991) and U.S. Pat. No. 5,919,296 (Jul. 6, 1999) each relate to the use of a polymethylhydrogensiloxane in the treatment of masonry, neither patent teaches the use of a combination of components including a polymethylhydrogensiloxane, an alkoxysilane, and a silicone resin.

Further, while U.S. Pat. No. 5,300,327 (Apr. 5, 1994) and U.S. Pat. No. 5,695,551 (Dec. 9, 1997) each relate to the use of an alkoxysilane and a silicone resin in the treatment of masonry, neither patent teaches the use of a combination of components including a polymethylhydrogensiloxane, an alkoxysilane, and a silicone resin.

In addition, none of these patent suggest that compositions used for treating masonry which include such a combination of components can also include either a volatile methyl siloxane or a cationic oil-in-water emulsion of an aminofunctional polydimethylsiloxane.

Thus, compositions according to this invention differ from what is known in the prior art in that the compositions contain a unique combination of components, i.e., the polymethylhydrogensiloxane, alkoxysilane, and silicone resin, which compositions may also further include either a volatile methyl siloxane or a cationic oil-in-water emulsion of an aminofunctional polydimethylsiloxane.

BRIEF SUMMARY OF THE INVENTION

This invention relates to low VOC penetrating water repellent compositions for use on inorganic building materials, including the emulsification and delivery of certain reactive silicon-based materials for improving the water repellency performance on substrates of inorganic building material. In particular, the invention is directed to compositions containing polymethyhydrogensiloxanes, alkoxysilanes, and silicone resins. VOC exempt silicone solvents can be included in these compositions for providing water repellency on inorganic building materials. In addition, other types of additives may be incorporated into these compositions in order to develop water repellency on such substrates in a reduced time frame. Such additives typically are selected so as to provide increased beading and/or increased water repellency performance.

In terms of their function in such compositions, the polymethyhydrogensiloxane excludes water; the alkoxysilane reduces darkening; and the silicone resin increases the ability of treated surface to exclude water under conditions involving the application of hydrostatic pressure, i.e., wind driven rain or high pressure application of water.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

Compositions according to this invention comprise a combination of components including a polymethylhydrogensiloxane, an alkoxysilane, and silicone resin. These compositions may also include other components such as a cationic oil-in-water emulsion of an aminofunctional polydimethylsiloxane, a volatile methyl siloxane, and mixtures thereof, for example.

The Polymethylhydrogensiloxane

Suitable polymethylhydrogensiloxanes for use in this invention include compositions having the formula

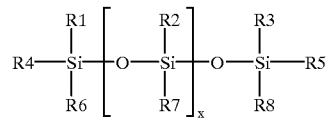

where R1 to R8 represent hydrogen or an alkyl group containing 1–6 carbon atoms, with the proviso that at least one of the groups R1 to R8 is hydrogen. In the formula, x is an integer of from 1 to about 200. Most preferred are compositions in which about one half of the groups R1 to R8 in the polymethylhydrogensiloxane are hydrogen; while the remainder of the groups are methyl groups.

One representative example of a polymethylhydrogensiloxane especially preferred for use herein is a trimethylsiloxy terminated polymethylhydrogensiloxane with a silicon-bonded hydrogen content of 1.4 to 1.75 weight percent, and having a viscosity between 20 to 40 centistoke (mm$^2$/sec.).

Polymethylhydrogensiloxane copolymers can also be used, and suitable copolymers include (alkylmethyl)(methylhydrogen)siloxane copolymers having the formula

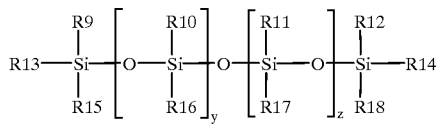

where the groups R9 to R18, except the groups R16 and R17, each represent an alkyl group containing 1–6 carbon atoms, typically a methyl group, R16 represents hydrogen, and R17 represents an higher alkyl group containing more than about six carbon atoms. The values of y and z can be from 1 to about 200.

Such polymethylhydrogensiloxane polymers and copolymers are commercially available from the Dow Corning Corporation, Midland, Mich., and are described, for example, in U.S. Pat. No. 5,074,912 (Dec. 24, 1991) and U.S. Pat. No. 5,919,296 (Jul. 6, 1999).

The Alkoxysilane

The alkoxysilane can constitute a single alkoxysilane or a mixture of alkoxysilanes can be employed. The alkoxysilane has the formula $R_aSi(OR')_{4-a}$. In the formula, R represents an alkyl group having 1–10 carbon atoms, preferably 1–8 carbon atoms, an alkenyl group having 2–8 carbon atoms, an aryl group such as phenyl, or an haloalkyl group such as chloropropyl and trifluoropropyl. The value of a is 1 or 2, and R' represents an alkyl group having 1–6 carbon atoms. Preferably, R is methyl, isobutyl, or n-octyl, and R' is methyl or ethyl.

Some suitable alkoxysilanes are methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, isobutyltriethoxysilane, butyltriethoxysilane, hexyltrimethoxysilane, n-octyltriethoxysilane, dimethyldimethoxysilane, dimethyldiethoxysilane, diethyldimethoxysilane, diisobutyldimethoxysilane, phenyltrimethoxysilane, dibutyldiethoxysilane, and dihexyldimethoxysilane.

Such alkoxysilanes are commercially available from the Dow Corning Corporation, Midland, Mich., and are described, for example, in U.S. Pat. No. 5,300,327 (Apr. 5, 1994), U.S. Pat. No. 5,695,551 (Dec. 9, 1997), and U.S. Pat. No. 5,919,296 (Jul. 6, 1999).

The Silicone Resin

The silicone resin can be any one of the various types of resinous copolymers described in detail in U.S. Pat. No. 5,695,551 (Dec. 9, 1999). However, most preferred for use herein are those resinous copolymers described as:

I. A resinous copolymeric siloxane prepared by a method comprising (i) forming an acidic homogenous mixture of a silanol containing resinous copolymeric siloxane with $R''_3SiO_{1/2}$ units and $SiO_{4/2}$ units; an organohydrogen polysiloxane with the formula $R''_bH_cSiO_{(4-b-c)/2}$ where b and c are positive integers with a sum less than four, preferably 1.9–2.1; and an organic solvent, and (ii) heating the mixture to remove substantially all organic solvent. R" can be an alkyl group with 1–6 carbon atoms; an aryl group such as phenyl, tolyl, and xylyl; an alkenyl group such as vinyl and allyl; or a trifluoropropyl group. R" can also be an arylalkyl group such as betaphenylethyl and betaphenylpropyl; or a cycloaliphatic group such as cyclopentyl, cyclohexyl, and cyclohexenyl.

II. A siloxane resin copolymer comprising $R''_3SiO_{1/2}$ units and $SiO_{4/2}$ units in a mole ratio such that the number average molecular weight is 1,200 to 10,000 dalton. Preferably, the mole ratio is 0.7:1.0, and the number average molecular weight is 5,000. R" is defined immediately above. This resin contains 2.5 weight percent silicon bonded OH groups. The resin may also contain $R''_2SiO_{2/2}$ units and $R''SiO_{3/2}$ units.

One silicone resin representative of such resinous copolymers which is especially preferred for use herein is a 70 weight percent xylene solution of a siloxane resin copolymer consisting essentially of $(CH_3)_3SiO_{1/2}$ units and $SiO_2$ units in a molar ratio of approximately 0.75:1 containing 2.4 to 2.9 weight percent of hydroxy, based on solids as determined by FTIR according to the American Society for Testing & Materials (ASTM) Test Procedure E-168.

The volatile Methyl Siloxane

The volatile methyl siloxane can be a linear volatile methyl siloxane (VMS), a cyclic volatile methyl siloxane, or a mixture of VMS. Volatile methyl siloxanes generally correspond to the average unit formula $(CH_3)_dSiO_{(4-d)/2}$ in which d has an average value of two to three. Representative siloxane units which may be present in such compositions are monofunctional "M" units $(CH_3)_3SiO_{1/2}$ and difunctional "D" units $(CH_3)_2SiO_{2/2}$. The presence of other siloxane units such as trifunctional "T" units $CH_3SiO_{3/2}$ and tetrafunctional "Q" units $SiO_{4/2}$ results in the formation of branched compositions.

Linear VMS have the formula $(CH_3)_3SiO\{(CH_3)_2SiO\}_eSi(CH_3)_3$ in which e is 0–5, and cyclic VMS have the formula $\{(CH_3)_2SiO\}_f$ in which f is 3–9. Preferably, these volatile methyl siloxane have a boiling point less than about 250° C. and a viscosity of 0.65 to 5.0 centistoke (mm²/s)

Representative linear volatile methyl siloxanes are hexamethyldisiloxane (MM) with a boiling point of 100° C., viscosity of 0.65 mm²/s, and formula $Me_3SiOSiMe_3$; octamethyltrisiloxane (MDM) with a boiling point of 152° C., viscosity of 1.04 mm²/s, and formula $Me_3SiOMe_2SiOSiMe_3$; decamethyltetrasiloxane ($MD_2M$) with a boiling point of 194° C., viscosity of 1.53 mm²/s, and formula $Me_3SiO(Me_2SiO)_2SiMe_3$; dodecamethylpentasiloxane ($MD_3M$) with a boiling point of 229° C., viscosity of 2.06 mm²/s, and formula $Me_3SiO(Me_2SiO)_3SiMe_3$; tetradecamethylhexasiloxane ($MD_4M$) with a boiling point of 245° C., viscosity of 2.63 mm²/s, and formula $Me_3SiO(Me_2SiO)_4SiMe_3$; and hexadecamethylheptasiloxane ($MD_5M$) with a boiling point of 270° C., viscosity of 3.24 mm²/s, and formula $Me_3SiO(Me_2SiO)_5SiMe_3$.

Representative cyclic volatile methyl siloxanes are hexamethylcyclotrisiloxane ($D_3$), a solid at room temperature, with a boiling point of 134° C. and formula $\{(Me_2)SiO\}_3$; octamethylcyclotetrasiloxane ($D_4$) with a boiling point of 176° C., viscosity of 2.3 mm²/s, and formula $\{(Me_2)SiO\}_4$; decamethylcyclopentasiloxane ($D_5$) with a boiling point of 210° C., viscosity of 3.87 mm²/s, and formula $\{(Me_2)SiO\}_5$; and dodecamethylcyclohexasiloxane ($D_6$) with a boiling point of 245° C., viscosity of 6.62 mm²/s, and formula $\{(Me_2)SiO\}_6$.

Representative branched volatile methyl siloxanes are heptamethyl-3-$\{$(trimethylsilyl)oxy$\}$trisiloxane ($M_3T$) with a boiling point of 192° C., viscosity of 1.57 mm²/s, and formula $C_{10}H_{30}O_3Si_4$; hexamethyl-3,3, bis $\{$(trimethylsilyl)oxy$\}$ trisiloxane ($M_4Q$) with a boiling point of 222° C., viscosity of 2.86 mm²/s, and formula $C_{12}H_{36}O_4Si_5$; and pentamethyl $\{$(trimethylsilyl)oxy$\}$ cyclotrisiloxane ($MD_3$) with the formula $C_8H_{24}O_4Si_4$.

Such volatile methyl siloxanes are commercially available from the Dow Corning Corporation, Midland, Mich.

The Cationic Oil-In-Water Emulsion of an Aminofunctional Polydimethylsiloxane

This emulsion is a silicone containing cationic emulsion of an amine substituted siloxane polymer having reactive silanol (≡SiOH) functionality. The siloxane polymer is generally stabilized in the form of an aqueous emulsion by means of a cationic and a nonionic surfactant. Typically, when these types of emulsions are broken, the siloxane polymer is no longer stabilized, and it is capable of crosslinking and curing by condensation of the silanol groups. The cationic surfactant most typically used in preparing such emulsions is Tallowtrimonium Chloride, a Cosmetic, Toiletry, and Fragrance Association (CTFA) INCI name for quaternary ammonium salts of trimethyltallow ammonium chloride [R'''N(CH$_3$)$_3$]+Cl$^-$ in which R''' is generally an alkyl group derived from tallow. The nonionic surfactant most typically used in preparing such emulsions is Nonoxynol-10, another CTFA INCI name for ethoxylated alkyl phenols C$_9$H$_{19}$C$_6$H$_4$(OCH$_2$CH$_2$)$_g$OH in which g is generally about ten. However, other surfactants can also be used in preparing emulsions of this type. Such emulsions are commercially available from the Dow Corning Corporation, Midland, Mich., and are described, for example, in U.S. Pat. No. 4,559,227 (Dec. 17, 1985) and U.S. Pat. No. 5,326,483 (Jul. 5, 1994).

The Solvent

Any solvent useful in masonry applications can be used including but not limited to such compositions as mineral spirits, alcohols such as isopropyl alcohol, and various of the hydrocarbon solvents such as toluene and xylene. One example of a solvent especially preferred for use herein is the composition KWIK-DRY® 66, an aliphatic hydrocarbon Stoddard type solvent, commonly known as mineral spirits, a trademark and product of the Ashland Chemical Company, Columbus, Ohio. The solvent can also consist of one or more of the various volatile methyl siloxanes noted above, especially the cyclic species octamethylcyclotetrasiloxane (D$_4$). In addition, glycol ethers such as diethylene glycol butyl ether and propylene glycol methyl ether which are sold under the trademark Dowanol® by The Dow Chemical Company, Midland, Mich., and polyglycols such as ethylene glycol and propylene glycol, can be employed as the solvent.

The Surfactant

As surfactant, most preferred is the combination of a low HLB nonionic surfactant and a high HLB nonionic surfactant. In particular, the low HLB nonionic surfactant should have an HLB value of less than 10.5, preferably less than 6.0. The high HLB nonionic surfactant should have an HLB value of greater than 15.0, and preferably greater than 17.0.

Representative surfactants in each category are enumerated in detail in U.S. Pat. No. 5,695,551 (Dec. 9, 1997), to which reference may be made for specific examples of appropriate surfactant combinations which can be employed.

In addition, the following surfactants have been found to be especially useful herein, i.e., SPAN 20, a nonionic surfactant with an HLB of 8.6, the tradename of ICI Surfactants, Wilmington, Del., for Sorbitan Monolaurate; ARALTONE T, a nonionic surfactant with an HLB of 9.0, the tradename of ICI Surfactants, Wilmington, Del., for polyoxyethylene 40 sorbitol septaoleate, i.e., PEG-40 Sorbitol Septaoleate; and G-4280, a nonionic surfactant with an HLB of 19.1, the tradename of ICI Surfactants, Wilmington, Del., for polyoxyethylene 80 sorbitan laurate, i.e., PEG-80 Sorbitan Laurate.

The Catalyst

If desired, a catalyst can be included as a component in compositions according to this invention, and representative catalysts are metal containing compositions such as dibutyltin dilaurate, dibutyltin dioctoate, and dibutyltin diacetate; titanate catalysts such as tetrabutyltitanate and tetraisopropyltitanate; acid catalysts such as acetic acid; and basic type catalysts, i.e., amines such as triethanolamine, morpholine, and diethylamine. Such catalysts are capable of converting the alkoxysilane to a resinous product by hydrolysis and condensation.

Other Optional Additives

A first optional additive that can be used according to this invention is a beading agent. Representative examples of some suitable beading agents are stearates such as aluminum stearate and magnesium stearate; borate salts such as sodium borate; and hydrophobic silica. These materials assist in shedding films of water from a surface by forming droplets.

A second optional additive that can be used is an organic wax. The organic wax is preferably carnauba wax or a blend of petroleum and synthetic waxes. More particularly, the organic wax is a blend which includes both paraffin and polyethylene waxes. The polyethylene waxes can be high or low density polyethylene waxes, or mixtures of high and low density polyethylene waxes. An exemplary organic wax, and an organic wax found to be especially suitable is JONWAX® 125, a product and trademark of SC Johnson & Sons Inc., Racine, Wis. JONWAX® 125 is sold as an aqueous emulsion of polyethylene and paraffin waxes with a solids content of about thirty-five percent. Other blended paraffin and polyethylene type waxes can also be employed.

A third optional additive that can be used is a preservative to reduce and or eliminate microbial activity in the water based emulsion. Representative examples of some suitable preservatives are the compound 5-chloro-2-methyl-4-isothiazolin-3-one sold under the tradename Kathon LX by the Rohm and Haas Co., Philadelphia, Pa., and the compound 1-(3-chloroallyl)-3,5,7-triaza-1-azoniaadamantane chloride sold under the trademark Dowicil® 75 by The Dow Chemical Company, Midland, Mich.

A fourth optional additive that can be used is an antifoam. Representative examples of some suitable antifoams are silicone antifoams such as silica filled polydimethylsiloxane sold by the Dow Corning Corporation, Midland, Mich.; and organic antifoams such as hydrocarbon oils sold under the trademark Advantage® by Hercules Incorporated, Wilmington, Del.

A fifth optional additive that can be used, especially where the composition is intended as an exterior coating, is a mildewcide, including materials classified as algicides, antimicrobials, bactericides, disinfectants, or fungicides; and which are organic or inorganic materials which reduce biological activity on a substrate. Representative examples of some suitable mildewcides include proprietary fungicide compositions sold under the trademark Troysan® Polyphase® P-20T by the Troy Chemical Company, East Hanover, N.J.; diiodomethyl-p-tolylsulfone sold under the trademark Amical® by Angus Chemical Co., Buffalo Grove, Ill.; tribasic copper sulfate; and stabilized chlorine dioxide.

A sixth optional additive that can be used, again especially when the composition is intended as an exterior coating, is a UV absorber/UV light stabilizer. Representative examples of some suitable UV absorber/UV light stabilizers are substituted benzotriazole and hindered amines sold under the trademark Tinuvin® by Ciba-Geigy Corporation, Hawthorne, N.Y.

A seventh optional additive that can be used to protect compositions during storage or in low temperature applications is a freeze-thaw ingredient such as ethylene glycol.

Amounts of Components of Composition

The amount of the various components used to prepare water-based or solvent-based compositions according to the invention is not critical, but generally should be in the following ranges. Thus, the composition can contain:

0.1–99 percent by weight, preferably 30–90 percent by weight of the polymethylhydrogensiloxane;

0.1–99 percent by weight, preferably 0.1–50 percent by weight of the alkoxysilane;

0.1–99 percent by weight, preferably 0.1–50 percent by weight of the silicone resin;

0–70 percent by weight, preferably 0.1–50 percent by weight of the volatile methyl siloxane or other solvent;

0–10 percent by weight, preferably 0.25–5 percent by weight of the cationic oil-in-water emulsion of the aminofunctional polydimethylsiloxane;

0.1–10 percent by weight, preferably 1–5 percent by weight of the surfactant;

0–2 percent by weight, preferably 0.1–2 percent by weight of the catalyst;

0–20 percent by weight, preferably 0.1–20 percent by weight of the beading agent;

0–20 percent by weight, preferably 0.1–20 percent by weight of the organic wax; and 0.01–5 percent by weight, preferably 0.1–2 percent by weight of each of the optional additives, i.e., the preservative, antifoam, mildewcide, UV absorber/UV light stabilizer, and freeze-thaw additive.

For water-based compositions, the balance of the solution or emulsion to 100 percent consists of water, while for the solvent-based compositions, the balance of the solution to 100 percent consists of the solvent or the volatile methyl siloxane.

Generally, the amount of solids in compositions according to the invention should be 0.1–90 percent by weight, preferably 5–50 percent by weight.

Preparation of Compositions

Water repellent compositions for treating surfaces according to this invention can be made by simply mixing together the various ingredients. Where a composition is desired in the form of an emulsion, it can be made by (i) making one emulsion of the several ingredients; (ii) making several emulsions each containing one or more of the ingredients, and combining the several emulsions; and (iii) following the procedure for (i) or (ii) and then adding some of the ingredients directly to water. These mixtures, solutions, and emulsions can be made using any suitable source of shear, such as a high speed stirrer, a homogenizer, sonolator, micro-fluidizer, Turello change can mixer, Ross mixer, or Eppenbach colloid mill. Where appropriate, hand mixing can also be employed. The procedure for making the mixtures, solutions, and emulsions can include the direct addition of oil to water/solvent, or the indirect addition of water/solvent to oil. Preferably, the particle size of the active ingredient(s) in the discontinuous or internal phase of an emulsion should be between about 0.1 micrometer ($\mu$m)/100 nanometer to about 5 micrometer ($\mu$m)/5,000 nanometer.

These water repellent compositions can be formulated as a concentrated solution or emulsion having a high solids content for later dilution and direct application to a substrate; or they can be formulated as ready-to-use solutions or emulsions with low solids content for direct application to the substrate. The actual amount of water repellent composition employed will vary, depending upon the nature of the substrate being treated, but in general, it should be sufficient to provide the substrate with a coating containing about 3–40 percent by weight of the solids in the water repellent composition being applied.

Substrates generally suitable for treatment with water repellent compositions according to our invention include cellulosic surfaces such as wood, fabric, fiber, paper, and paperboard; masonry surfaces such as porous inorganic substrates including concrete, mortar, brick, stone, gypsum, stucco, terra cotta, adobe, plaster, limestone, marble, porcelain, and tile; and concrete building structures.

The method of application of the water repellent composition is preferably by topical treatment or topical coating of the substrate, but the use of these water repellent compositions can include their incorporation directly into a substrate during its manufacture, i.e., as an additive in a paper slurry, or as an ingredient in a concrete mix prior to its setting. When applied topically, for best results, it is preferred that the substrate be treated when it is dry, but substrates can be treated when they are damp or wet.

Test Methods and Procedures

21 Day Water Exclusion Test

A modified version of the National Cooperative Highway Research Program (NCHRP) Test Procedure as outlined in their Report No. 244 entitled "21 Day Water Exclusion Testing" was used to determine water repellency characteristics. A lightweight concrete block was obtained and cut into 2"×2"×3.5" cubes. These cubes were then conditioned at 110° C. for 48 hrs. Once the blocks were conditioned, three cubes were used to evaluate the water repellent coatings, and compared to three cubes which were untreated. The cubes were coated with the water repellent composition and allowed to cure for 7 days at room temperature before the cubes were placed into a water bath. The untreated and treated cubes were placed into a water bath so that one inch of water was above the cubes. Water exclusion was calculated by comparing the weight of untreated cubes to that of treated cubes at different times up to 21 days. Water exclusion is calculated by taking the average weight difference of 3 untreated cubes and subtracting the average weight difference of 3 treated cubes and dividing by the average weight difference of 3 untreated cubes, multiplied by 100; as expressed in the formula below:

$$\text{Percent WE}=[(C2-C1)-(S4-S3)]\times 100/(C2-C1)$$

where S3 is the weight of a treated specimen before water immersion, S4 is the weight of a treated specimen after water immersion, C1 is the weight of an untreated control before water immersion, and C2 is the weight of a treated control after water immersion. In terms of this test procedure, the higher the percent water exclusion the better is the performance.

Modified American Society for Testing & Materials (ASTM) Test Procedure E-514

According to this procedure, three block specimens are oven dried at 110° C. for a minimum of 24 hours prior to testing. The weight of each specimen is determined and recorded as the initial untreated weight. Each specimen is connected to the test apparatus using I-beams provided as part of the testing apparatus. Water and air supplies are activated to provide a water flow of 60–70 gallons per hour at a pressure of 2 inches of water. The tare weight of the water collection bucket is obtained. Leakage or wet spots which form on the blocks are recorded. The untreated blocks are allowed to remain in the test apparatus until 2.3 gallons of water has been removed from the test chamber. The amount of time for removing 2.3 gallons of water is recorded. The test blocks are removed and their weight is recorded. The weight of the water collection bucket is also recorded. The leak rate of the 3 blocks is calculated by determining the amount of water in the collection bucket and dividing it by the amount of time it took for the water to pass through the test chamber. After completing the leak rate for untreated blocks, the blocks are re-dried at 110° C. for 24 hrs. A water repellent composition is applied to each specimen and allowed to cure 7 days at room temperature. Once the water repellent composition has been cured, the leak rate of the treated block is determined by the same procedure used for the untreated block. The percent reduction in leak rate is determined by taking the difference between the untreated block leak rate and the treated leak rate, and dividing it by the untreated leak rate, and multiplying by 100; according to the formula below:

(A1−B1)/A1×100=Percent Reduction where A1 is the untreated block leak rate and B1 is the treated block leak rate. In terms of this test procedure, the higher the percent reduction the better is the performance.

Darkening

One half of a 2"×2"×3.5" lightweight concrete block is soaked in the water repellent composition. The block is allowed to cure for periods of 1, 4, and 7 days. Each day an observation is made to determine the difference between the treated half and the untreated half. The darkening is then evaluated on a scale of 1 to 5, in which 1 indicates no darkening, 2 indicates very slight darkening, 3 indicates noticeable darkening, 4 indicates dark, and 5 indicates extremely dark.

Particle Size

A MICROTRAC UPA 150 Particle Size Analyzer was used to measure emulsion particle size after the emulsion had been prepared. Two drops of the emulsion were placed into 10 grams of deionized water. The mixture was placed in the analyzer cell and the sample was analyzed to determine the particle size.

Emulsification Procedure

A mixture of the organosilicon components is formed and weighed into a small beaker, the low HLB surfactant is added to the small beaker, and the contents of the small beaker are mixed for 15 minutes at 300 rpm. The aqueous continuous phase, i.e., water, is weighed and placed into a larger beaker, the high HLB surfactant is added to the larger beaker, and the contents of the larger beaker are mixed for 15 minutes at 300 rpm. The speed of the mixer in the larger beaker is increased to 500–700 rpm, and the contents of the small beaker is slowly poured to the larger beaker. Mixing of the combined contents of the two beakers is then continued for 30 minutes. The crude emulsion is poured into a plastic bottle, and the emulsion is sonolated at 1800 psi for about 3 minutes, in order to complete emulsification.

EXAMPLES

The following examples are set forth in order to illustrate this invention in more detail.

Example 1
A Solvent-Based Composition

A mixture was prepared containing a polymethylhydrogensiloxane, a silicone resin, and the alkoxysilane n-octyltriethoxysilane, in a weight ratio of about 8:1:1, respectively. The mixture was diluted to about 20% solids in KWIK-DRY® 66 aliphatic hydrocarbon Stoddard type solvent, and the composition was applied to a lightweight concrete block. A coverage rate of about 55 ft²/gallon was used for this 20% solids mixture according to ASTM Test Procedure E-514; and a 30 second immersion of test cubes was used in determining the characteristics of this composition under the protocol of the NCHRP 21 Day Water Exclusion Test. The performance of the composition under these conditions is shown in Table 1.

The polymethylhydrogensiloxane used in this example and in the following examples was a trimethylsiloxy terminated polymethylhydrogensiloxane with a silicon-bonded hydrogen content of about 1.4 to 1.75 weight percent having a viscosity between about 20 to 40 centistoke (mm²/sec.).

The silicone resin used in this example and in the following examples was a siloxane resin copolymer having $R''_3SiO_{1/2}$ units and $SiO_{4/2}$ units in a mole ratio of about 0.7:1.0. The number average molecular weight was about 5,000. R'' was the methyl group. The silicone resin contained about 2.5 weight percent silicon bonded OH groups.

Example 2
An Emulsion Form of Composition

An emulsion was prepared with a polymethylhydrogensiloxane, a silicone resin, and alkoxysilane n-octyltriethoxysilane, using the emulsification procedure described above. The three organosilicon components were combined in a weight ratio of 8:1:1, respectively. The emulsion was prepared using 40 parts by weight of the three organosilicon components, 13.3 parts by weight of a volatile methyl siloxane which was octamethylcyclotetrasiloxane, 0.6 parts by weight of SPAN 20 nonionic surfactant with an HLB of 8.6, 1.0 parts by weight of ARALTONE T nonionic surfactant with an HLB of 9.0, 1.4 parts by weight of G-4280 nonionic surfactant with an HLB of 19.1, i.e., PEG-80 Sorbitan Laurate, 0.8 parts by weight of the freeze-thaw additive ethylene glycol, and 42.9 parts by weight of water. The emulsion was diluted to a 1:1 ratio with more water, and then applied to test substrates. The performance of this emulsion composition is shown in Table 1.

Example 3
Another Emulsion Form of Composition

A second emulsion was prepared according to the procedure used in Example 2, except that there was added to the diluted emulsion in Example 2, about 2.2 parts by weight of a cationic oil-in-water emulsion of an aminofunctional polydimethylsiloxane having reactive silanol functionality, stabilized by a cationic and a nonionic surfactant. The performance of this emulsion composition is shown in Table 1.

Example 4
Comparative

A solution containing about 20 percent by weight of n-octyltriethoxysilane was prepared using a titanate catalyst in isopropyl alcohol. The composition was applied to a lightweight concrete block. A coverage rate of about 55 ft²/gallon was used for this composition according to ASTM Test Procedure E-514; and a 30 second immersion of test cubes was used in determining the characteristics of this composition under the protocol of the NCHRP 21 Day Water Exclusion Test. The performance of the composition under these conditions is shown in Table 1.

Example 5
Comparative

Example 4 was repeated except that no titanate catalyst was employed. The performance of the composition is shown in Table 1.

Example 6
Comparative

A solution was prepared containing about 20 weight percent of the silicone resin used in Example 1 in KWIK-DRY® 66 aliphatic hydrocarbon Stoddard type solvent. The composition was applied to a lightweight concrete block. A coverage rate of about 55 ft²/gallon was used for this composition according to ASTM Test Procedure E-514; and a 30 second immersion of test cubes was used in determining the characteristics of this composition under the protocol of the NCHRP 21 Day Water Exclusion Test. The performance of the composition under these conditions is shown in Table 1.

Example 7
Comparative

A solution was prepared containing about 20 weight percent of the polymethylhydrogensiloxane used in Example 1 in KWIK-DRY® 66 aliphatic hydrocarbon Stoddard type solvent. The composition was applied to a lightweight concrete block. A coverage rate of about 55 ft²/gallon was used for this composition according to ASTM Test Procedure E-514; and a 30 second immersion of test cubes was used in determining the characteristics of this composition under the protocol of the NCHRP 21 Day Water Exclusion Test. The performance of the composition under these conditions is shown in Table 1.

TABLE 1

| Example | 21 Day Water Exclusion (%) | ASTM E-514 % Reduction | Darkening | Particle Size (nanometer) |
|---|---|---|---|---|
| 1 | 55.4 | 98.7 | 3 | Not applicable |
| 2 | 44.6 | 72.8 | 2 | 586 |
| 3 | 45.6 | 93.3 | 2 | 586 |
| 4 | 49.7 | 95.5 | 2 | Not applicable |
| 5 | 38.5 | −10.7 | 1 | Not applicable |
| 6 | 25.5 | 88.3 | 5 | Not applicable |
| 7 | 46.1 | 88.3 | 3 | Not applicable |

Table 1 shows that the compositions prepared according to the present invention, i.e., Examples 1–3, provide improved performance overall in practically all categories evaluated, in contrast to compositions in the Comparative Examples 4–7. The slight difference in darkening between ratings of 2 for very slight darkening and ratings of 3 for noticeable darkening is not considered significant.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of treating the surface of a mineral substrate used in the construction industry selected from the group consisting of brick, cured concrete, sewer pipe, hollow block, cured mortar, stucco, decorative stone, roofing tile, highway surfaces, bridges, concrete, stone brick building exteriors, brick building exteriors, footings, and retaining walls, by applying to the surface of the mineral substrate a composition comprising a mixture formed by combining (i) water or a solvent; (ii) a methylhydrogensiloxane polymer or copolymer; (iii) an alkoxysilane having the formula $R_aSi(OR^1)_{4-a}$ in which R represents an alkyl-group containing 1–10 carbon atoms, an alkenyl group containing 2–8 carbon atoms, an aryl group, or a haloalkyl group, a has a value of 1 or 2, and $R^1$ represents an alkyl group containing 1–6 carbon atoms; (iv) a silicone resin; and (v) a volatile methyl siloxane or a cationic oil-in-water emulsion of an amino-functional polydimethylsiloxane.

2. The method according to claim 1, wherein the alkoxysilane is selected from the group consisting of methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, isobutyltriethoxysilane, butyltriethoxysilane, hexyltrimethoxysilane, n-octyltriethoxysilane, dimethyldimethoxysilane, dimethyldiethoxysilane, diethyldimethoxysilane, diisobutyldimethoxysilane, phenyltrimethoxysilane, dibutyldiethoxysilane, and dihexyldimethoxysilane.

3. The method according to claim 1, wherein the silicone resin is a resinous copolymer selected from the group consisting of (I) resinous copolymeric siloxanes prepared by (i) forming an acidic homogenous mixture of a silanol containing resinous copolymeric siloxane with $R^{11}_3SiO_{1/2}$ units and $SiO_{4/2}$ units; an organohydrogen polysiloxane with the formula $R^{11}_bH_cSiO_{(4-b-c)/2}$ where b and c are positive integers with a sum less than four; and an organic solvent, and (ii) heating the mixture to remove substantially all organic solvent; in which $R^{11}$ is an alkyl group with 1–6 carbon atoms, an aryl group, an alkenyl group, a trifluoropropyl group, an arylalkyl group, or a cycloaliphatic group; and (II) siloxane resin copolymers containing $R^{11}_3SiO_{1/2}$ units and $SiO_{4/2}$ units in a mole ratio such that the number average molecular weight is 1,200 to 10,000 dalton, in which $R^{11}$ is the same as defined in (I), and the resin contains at least about 2.5 weight percent of silicon bonded OH groups.

4. The method according to claim 1, wherein the methylhydrogensiloxane is a polymer having the formula

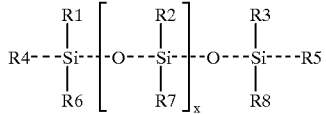

where R1 to R8 represent hydrogen or an alkyl group containing 1–6 carbon atoms, with the proviso that at least one of the groups R1 to R8 is hydrogen, and x has a value of 1–200;

or a copolymer having the formula

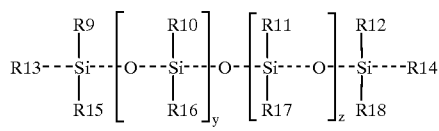

where each of the groups R9 to R18, except for the groups R16 and R17, each represent an alkyl group containing 1–6 carbon atoms, R16 is hydrogen, R17 is a higher alkyl group containing more than about six carbon atoms, and y and z each have a value of 1–200.

5. The method according to claim 1, further comprising at least one additional component selected from the group consisting of a surfactant, a catalyst, a beading agent, an organic wax, a preservative, an antifoam, a mildewcide, an UV absorber/UV light stabilizer, and a freeze-thaw additive.

6. The method according to claim 5, wherein the additional component is at least two surfactants, one surfactant having an HLB less than 10.5, and the other surfactant having an HLB more than 15.

7. The method according to claim 6, wherein the composition is emulsified.

* * * * *